United States Patent [19]

Miles

[11] 3,851,442
[45] Dec. 3, 1974

[54] APPARATUS FOR FORMING, INTERLEAVING AND DISPENSING FOOD PATTIES

[76] Inventor: Bernard Miles, 285 Vermont Ave., Irvington, N.J. 07111

[22] Filed: Dec. 21, 1972

[21] Appl. No.: 317,439

[52] U.S. Cl.................. 53/122, 53/157, 53/389, 17/32, 271/35
[51] Int. Cl... B65b 25/08, B65b 35/50, B65b 41/02
[58] Field of Search ......... 53/157, 389, 122; 17/32; 214/6 DK, 6 M; 271/35, 168

[56] References Cited
UNITED STATES PATENTS

| | | | |
|---|---|---|---|
| 1,976,788 | 10/1934 | Kurth | 271/35 |
| 3,424,294 | 1/1969 | Felstehausen | 53/122 X |
| 3,589,711 | 6/1971 | Holly | 53/122 X |
| 3,675,387 | 7/1972 | Lekan | 53/122 X |
| 3,710,533 | 7/1969 | Burns | 53/157 |

*Primary Examiner*—Robert L. Spruill
*Attorney, Agent, or Firm*—Thomas Cifelli, Jr.

[57] ABSTRACT

Apparatus for forming, interleaving and dispensing meat patties has a chopped meat feeding unit which supplies meat to a continuously cycling molding apparatus to form meat patties. An interleaving paper dispensing apparatus positions individual sheets of paper on support means beneath the output point of the meat patty molding mechanism so that each meat patty formed will be interleaved between separate sheets of paper. The support means for the interleaved patty are then rapidly withdrawn to allow the patty to drop vertically, so that the interleaved patties will form a stable stack.

20 Claims, 14 Drawing Figures

PATENTED DEC 3 1974

APPARATUS FOR FORMING, INTERLEAVING AND DISPENSING FOOD PATTIES

BACKGROUND OF THE INVENTION

1. Field of the Invention

This invention relates to butchering equipment and, more particularly, to a device for forming, interleaving and dispensing patties of chopped meat or other food.

2. Description of the Prior Art

With the increased popularity of hamburgers, many machines have been developed to manufacture preformed hamburgers for use in restaurants, fast-food retailing outlets and for sale in supermarkets. Most of these machines are designed to take prechopped meat and form it into meat patties of a predetermined size in diameter and thickness, then interleave sheets of separating paper between the individual meat patties formed, and then stack or dispense the patties in conveninet stacks for further handling.

One of the major problems that has been encountered with the operation of these machines has been the interleaving and dispensing mechanisms of these machines. Specifically, it is found that it has been difficult to provide machines which can uniformly and accurately interleave a sheet of separating paper between the patties formed by the machine and then, after the interleaving process is completed, stack the interleaved patties so that they can be handled further.

The problems with the interleaving and stacking are in two major areas. The first is with respect to the synchronized positioning of a single, individual sheet of paper below each meat patty produced by the machine, and the second is the problem of effectively stacking the patties. For example, the machines shown in U.S. Pat. Nos. 3,347,176, 3,461,483, and 3,488,918, all provide single sheets of paper by slicing these sheets from a long, continuous roll of paper. This system has proved less than successful because of the possible difficulties arising from the slicing operation of the paper. If the knife which is used to cut the paper does not properly function, the paper will not be provided in time to intercept or be below the patty which is produced by the machine.

Other machines, such as the one shown in U.S. Pat. No. 3,347,176, even provide a means for interleaving the patties which requires that a sheet of paper and a patty meet in midair, and then fall to a predetermined depositing area.

The second problem concerns the stacking of the interleaved patties. This problem has been even more difficult to resolve than the problem of providing the individual sheets of interleaving paper in synchronized relationship. Most often, for one reason or another, the patty with the paper beneath it will not fall to a proper depositing area in a truly horizontal attitude. Instead, the interleaved patty will land on one edge or another and, therefore, tend to tip over any stack which has been formed, causing problems in handling of the output of the patty forming machine.

Attempts to properly align the interleaved patties have not proved completely successful. For example U.S. Pat. No. 3,488,918 provides a wire flipper apparatus to hold a sheet of interleaving paper. These wire flippers are supposed to be moved out of the way by the weight of the falling patty. U.S. Pat. Nos. 3,461,483, 3,126,683, and 3,388,529 all use a fixed frame which is supposed to have a hollow or an empty middle section just slightly smaller than the size of the individual sheets, so that the individual sheets will be supported at their peripheral edges and will be deformed sufficiently by the weight of the patty to fall through the frame to thereby fall in an even stack beneath the paper holding frame.

None of these patents, however, show a means for positively aligning the patty on the paper and then, by means of a direct, positive linkage, providing a means for stacking the patty to insure that the patty will fall in a uniform, erect stack.

SUMMARY OF THE INVENTION

To overcome the problems of the prior art, the present invention sets forth apparatus for forming, interleaving and dispensing food patties which provides a patty molding apparatus, coacting with a paper dispensing apparatus in synchronized relationship, so that an individual sheet of interleaving paper will be deposited below and receive each individual food patty produced by the molding section of the machine. A positive mechanical linkage is provided to remove the support on which the sheet of paper and patty resting on this sheet are held. The platform or support member is removed faster than the forces of gravity can cause the patty and interleaving paper to drop, so that the meat patty and paper will retain a true horizontal attitude and fall directly down beneath the support platform to form a uniform stack.

Accordingly, in view of the above it is an object of the present invention to provide an apparatus for forming, interleaving and dispensing food patties which provides synchronized dispensing of the patties with individual sheets of paper interleaved between the patties.

Another object of the present invention is to provide an apparatus for forming, interleaving and dispensing food patties, which accurately interleaves individual sheets of paper with patties, so that the patties and papers are always accurately aligned and positioned.

It is a further object of the present invention to provide an apparatus for forming, interleaving and dispensing food patties, which prevents tipping of the interleaved patties and paper, so that the patties will form a uniform stack.

Still another object of the present invention is to provide an apparatus for forming, interleaving and dispensing food patties, which dispenses interleaved patties in a proper attitude to form neat piles for easy handling.

It is also an object of the present invention to provide an apparatus for forming, interleaving and dispensing food patties, which provides uniformly sized patties.

Another object of the present invention is to provide an apparatus for forming, interleaving and dispensing food patties of uniform consistency.

It is a further object of the present invention to provide an apparatus for forming, interleaving and dispensing food patties, which can provide patties of various predetermined thicknesses.

Still another object of the present invention is to provide an apparatus for forming, interleaving and dispensing food patties which do not have any large voids or air bubbles.

It is yet another object of the present invention to provide an apparatus for forming, interleaving and dispensing food patties which is relatively reliable in service.

An additional object of the present invention is to provide an apparatus for forming, interleaving and dispensing food patties which provides a product of uniform size.

It is also an object of the present invention to provide an apparatus for forming, interleaving and dispensing food patties which furnishes a visible indication of the amount of paper left for interleaving.

Another object of the present invention is to provide an apparatus for forming, interleaving and dispensing food patties which dispenses individual sheets of paper one at a time, without requiring cutting of the sheets of paper.

It is a further object of the present invention to provide an apparatus for forming, interleaving and dispensing food patties which provides means for properly aligning the individual sheets of paper directly underneath the location where the patties formed by the apparatus are delivered.

Other objects and advantages will be apparent from the following description of an embodiment of the invention, and the novel features will be particularly pointed out hereinafter in connection with the appended claims.

DESCRIPTION OF THE PREFERRED EMBODIMENT

As shown in the drawings, a machine for forming, interleaving and dispensing food patties, generally indicated at 20, has a housing 22 enclosing a drive system which powers a meat feeding system including a hopper 26 for providing chopped food to a patty forming mold system which includes a mold plate 28 for forming food patties which are then ejected from the mold plate by a mold ejection means, generally indicated at 30. A paper interleaving system, generally indicated at 32, is disposed at the side of the machine and feeds the interleaving papers to an interleaving and stacking system, generally indicated at 34, which arranges individual sheets of paper between each patty produced by the patty molding unit, and then arranges to stack the interleaved patties in a neat stack, shown at 36 in FIG. 7.

Figures 1, 2, 3, 4:
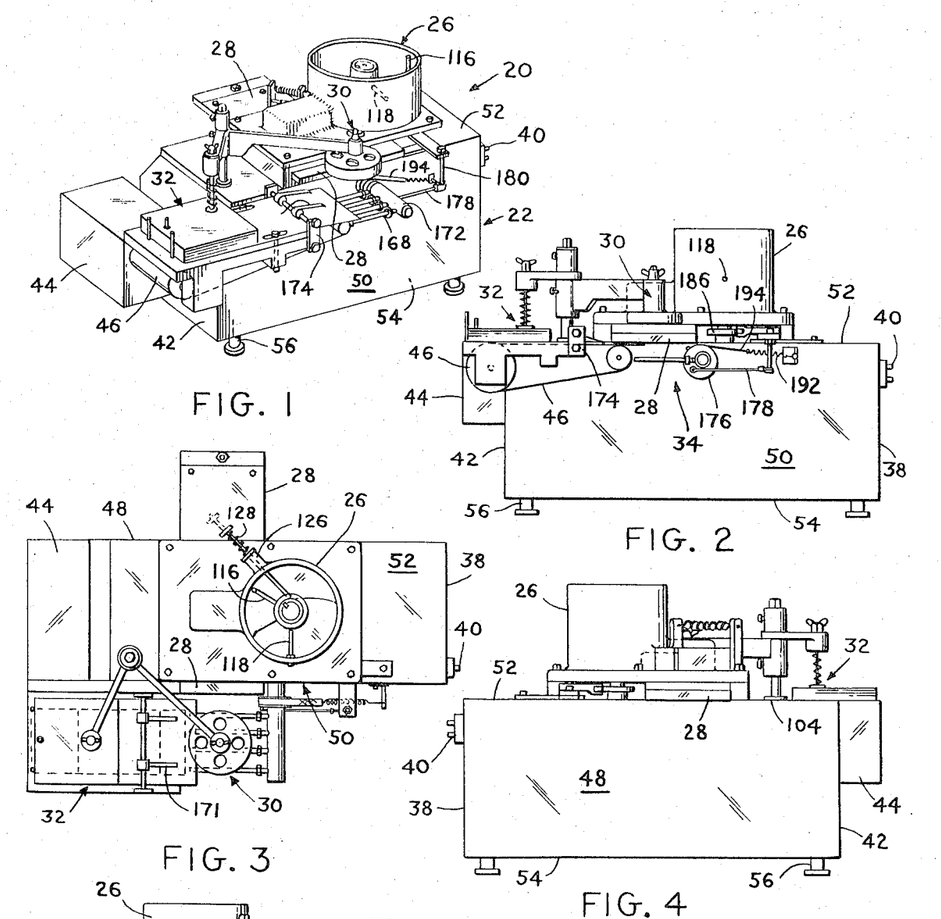
FIG. 1 shows a perspective view of an apparatus for forming, interleaving and dispensing food patties, built in accordance with the teachings of the present invention.
FIG. 2 is a front elevation of the machine shown in FIG. 1.
FIG. 3 is a plan view of the machine shown in FIG. 1.
FIG. 4 is a back elevation of the machine shown in FIG. 1.
Figure 5:
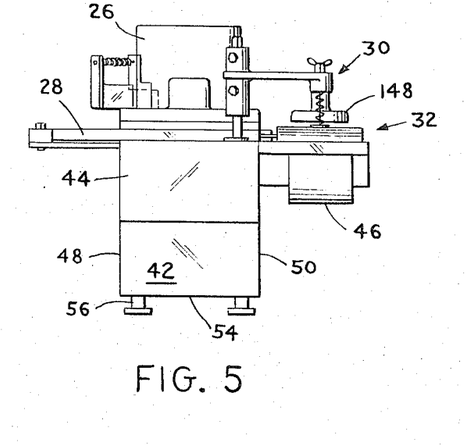
FIG. 5 is a left end elevation of FIG. 2.
Figure 6:
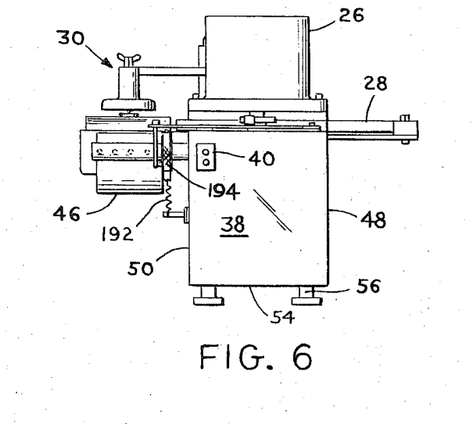
FIG. 6 is a right end elevation of FIG. 2.
Figure 7:
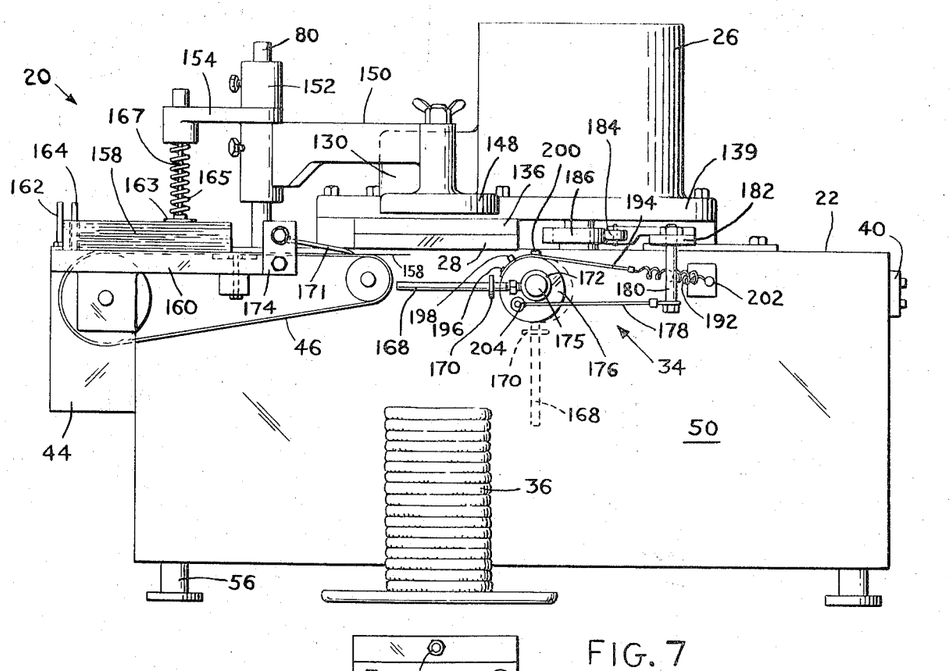
FIG. 7 is an enlarged front view of the machine.
Figure 8:
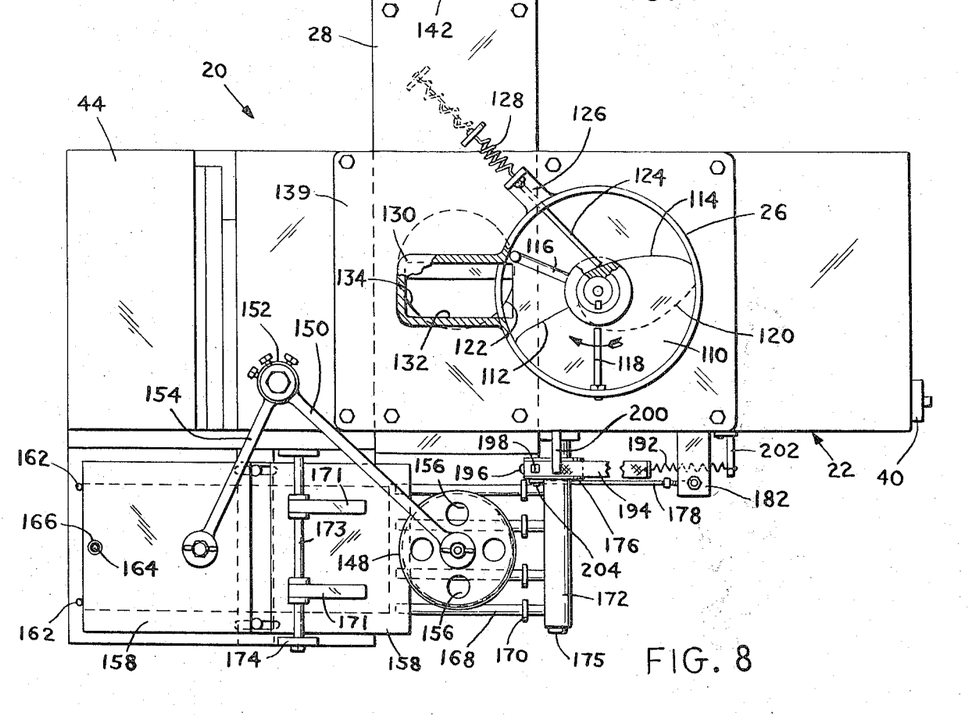
FIG. 8 is an enlarged top view of the machine.
Figures 9, 10, 11, 12, 13, 14:
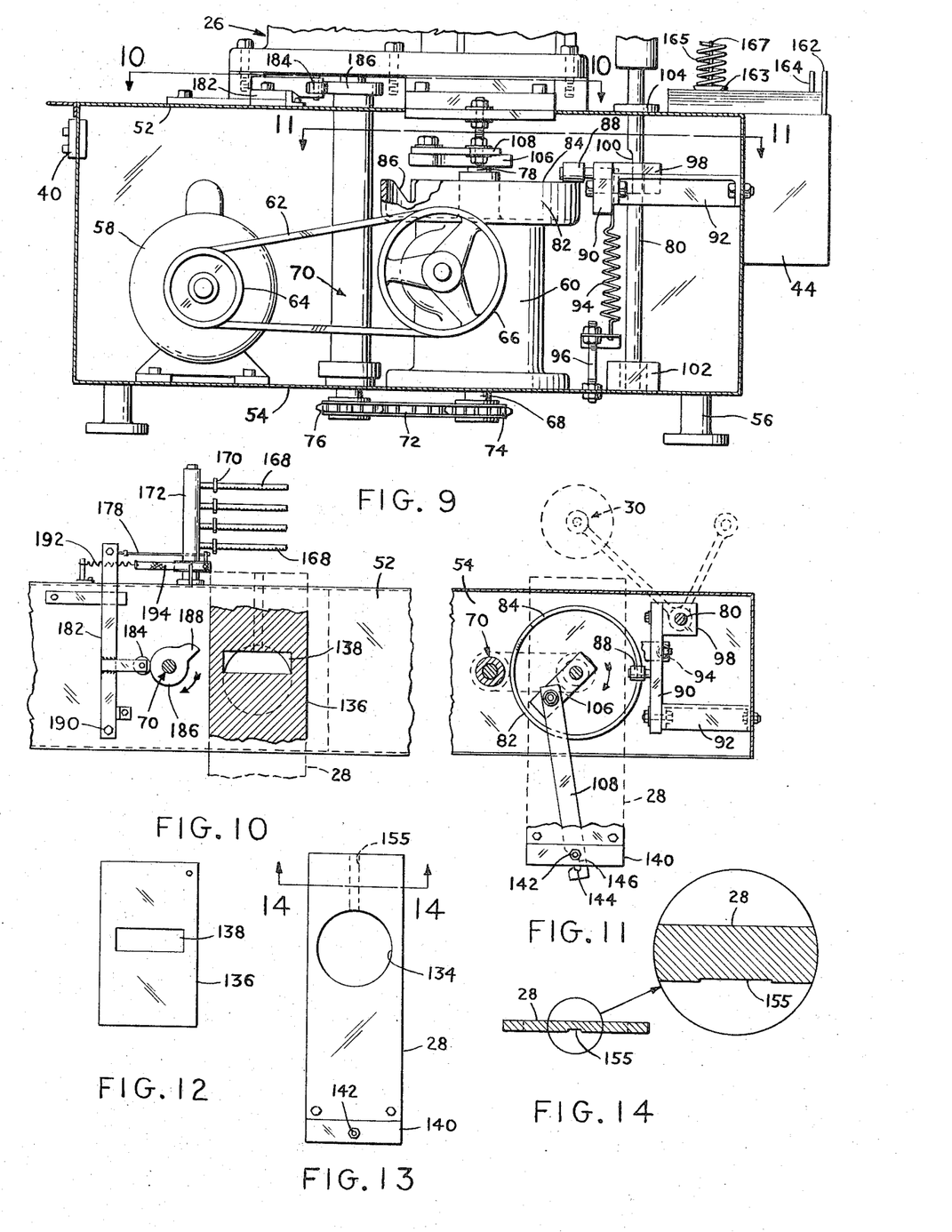
FIG. 9 is an enlarged back view of the machine, with the cover removed, showing the internal workings of the machine.
FIG. 10 is a section, taken along line 10—10 of FIG. 9.
FIG. 11 is a view taken along line 11—11 of FIG. 9, showing the linkage arrangement of the reduction motor.
FIG. 12 is a top view of the fixed spacer plate used in the machine shown in FIG. 1.
FIG. 13 is a top view of the mold plate, with a hold cavity formed therein, used in the machine shown in FIG. 1.
FIG. 14 is a cross section, taken through line 14—14 of FIG. 13, showing an air groove in the bottom of the mold plate.

As shown in FIGS. 1 through 9, the housing 22 consists of a side wall 38 on which is mounted an electric switch 40, an opposite side wall 42 on which is mounted an electric motor 44 for a conveyor belt 46, whose function will be described later, a back wall of the housing 48 and a front wall 50. As shown in FIG. 9, the housing also has a top wall 52 and a bottom wall 54, which is supported by a plurality of legs 56.

The housing encloses a drive system consisting of a drive motor 58 mounted to the bottom wall 54 of the housing by any convenient means, as for example by bolting, as shown in FIG. 9, which drive motor drives a speed reducing transmission 60 through a transmission belt 62 connected to a drive motor pulley 64 and a transmission pulley 66.

A shaft 68 extending from the bottom of speed reduction transmission 60 drives a rotating vertical shaft 70 through a drive chain 72 connecting evenly sized sprockets 74 and 76 on the bottom of the transmission shaft and the vertical rotating shaft respectively to provide a uniform, one-to-one rotational speed between the transmission and the rotating vertical shaft.

A shaft 78 extends upward from the top of the speed reduction transmission 60 and this shaft drives a vertical, oscillating shaft 80 through a cam 82 which rotates with the output shaft 78 of the transmission. As shown in FIG. 9, the cam 82 has an upper cam surface 84 with a cut out portion 86. A cam roller 88 is held in camming engagement with the cam surfaces 84 and 86 of the cam 82 by means of a cam roller lever arm 90 which is supported at one end by a bracket 92 and biased downward by a spring 94 anchored to the base of the housing by a bolt and bracket combination 96. The other end of cam roller lever arm 90 is fastened to a block 98 which, in turn, is fixedly fastened to the oscillating vertical shaft 80 at a flat section of the shaft 100 by means of a set screw or any other convenient fastening means. The vertical oscillating rod 80 is allowed to move up and down with relation to the housing and is held in vertical position by means of a base guide 102 anchored to the floor of the housing and a top guide bushing 104 connected to the top 52 of the housing.

The shaft 78 from the top of speed reduction transmission 60, in addition to driving cam 82, also drives a crank arm 106 which drives the mold plate 28 through a linkage arm 108.

The vertical rotating shaft drives the meat feeding system, which incorporates hopper 26, and also the interleaving, stacking system, generally indicated at 34. The top output shaft of the speed reduction transmission 60 drives the mold plate 28 of the patty molding unit and additionally the cam 82 which, in turn, drives the vertical oscillating shaft 80. The vertical oscillating shaft, in turn, powers the mold ejection means 30 and a substantial portion of the paper dispensing means. These various functions and components of the apparatus will be described separately in detail below.

The first step in processing any material, such as meat, through the machine consists of placing a quantity of previously chopped meat which is to be formed into the meat patties into the meat hopper 26, where the meat will be stirred and mixed to a uniform consistency and fed in individual quantities to the patty molding system. A meat feeder unit 110 is rotated by vertical rotating shaft 70 within hopper 26, and has a leading edge 112 and a trailing edge 114, as shown in FIG. 8, and has a stirring rod 116 adapted to rotate around with the unit, to stir the meat in the hopper in coaction with a meat retaining rod 118 which extends from the wall of the hopper. A cam shaped wall 120 is formed on the bottom of the meat feeder unit and serves two purposes. First, it pushes a quantity of meat which has fallen ahead of the leading edge 112 of the meat feeder unit as shown in FIG. 8 towards the outlet port 122 of the hopper in cooperation with a movable vane 124 to form a pocket which compresses the meat trapped ahead of the cam shaped wall. Additionally, the cam wall 120 coacts with the movable vane 124 to force the vane 124 to slide in the vane housing 126 against the urging of spring 128, so that the vane will be out of the way to permit the meat feeding unit to continue revolving within the hopper.

The opening 122 from the hopper 26 leads to a housing 130 which has a rectangularly shaped opening 132 through which the meat forced from the hopper will pass under the pressure of the rotating feed unit, to fill the patty molding system which will now be described.

As shown in FIGS. 9 through 14, the patty molding system consists of a mold plate 28 having a mold cavity 134 formed in the plate. The thickness of the plate and the size of the mold cavity will determine the size of the patty produced. The plates can vary in thickness up to about one and one-half inches (1½ inches), and the size and shape of the cavity can be widely varied without affecting the operation of the device. So, for example, it is quite feasible to produce geometrical shapes, other than circles, or, for example, even shapes which resemble pork chops or veal cutlets.

The mold plate 28 is mounted below a spacer plate 136 which has a rectangular opening 138 and is fixedly mounted to an upper section 139 of the top of the housing. The mold plate 28 is oscillated in a horizontal plane by the crank 106 and connecting link 108 driven by the upper output shaft of the speed reduction transmission. The connecting link 108 is connected to a back drive unit 140 which is connected to the end of the mold plate 28 by any convenient attaching method, such as bolting, and which has a pin 142 extending downward to engage a hook 144 at the end of a timing slot 146 in the end of connecting link 108. As output shaft 78 of transmission 60 rotates, the crank 106 will rotate in the direction of the arrow shown in FIG. 11, and connecting link 108 will engage pin 142 to oscillate the back drive unit and, therefore, the mold plate 28, thereby moving the mold cavity 134 backwards and forwards in a predetermined path of travel. The timing slot 146 at the end of the connecting link 108 provides a pause in the travel of the mold plate 28, during which time the length of the slot passes over the pin 142. The purpose of this pause in travel will become apparent when discussed below.

The oscillation of the mold plate 28 brings the mold cavity 134 into registration with the rectangular slot 138 in the spacing plate and the rectangular opening 132 in the bottom of the outlet housing 130 from the hopper, so that meat which has been forced into the outlet housing under the action of the meat feeder unit will flow through the rectangular passages in the bottom of the meat feeder housing, and the spacer plate to fill the mold cavity as it passes underneath the openings. At the other end of the path of travel of the mold plate, the mold cavity 134 will be positioned directly underneath the knock out cup 148 of the mold ejection means 30. As shown in FIGS. 7 and 8, the knock out cup 148 is mounted on a patty ejection arm 150 and is secured to the upper end of vertical oscillating shaft 80 by means of a retaining cylinder 152 connected to shaft 80 by any convenient means, such as a set screw as shown, and by means of a paper pressure arm 154, whose function will be explained later. Accordingly, when the oscillating vertical shaft 80 drops downward because of the coaction of cam surface 86 and cam roller 88, the knock out cup 148 will also come down directly to the mold cavity 134 which is positioned below the arm and filled with meat in the shape of the mold cavity.

As shown in FIGS. 13 and 14, the mold plate 28 has a groove 155 which runs from the mold cavity 134 to the front of the mold plate. This groove serves a very important function in that it provides an air passage between the bottom of the mold plate 28 and the top 52 of the housing of the machine through which passage the air in the mold cavity can escape when the cavity is being filled with the meat. Without this passage, very often the fats and oils which are plentiful in the chopped meats and other foods used to form the patty will tend to form a seal between the interfaces of the mold cavity 134 and the lower surface of the spacing plate 136 and the top of the machine housing which would prevent the air from escaping. Without an air escape passage, there would be large quantities of air trapped within the mold cavity which would either produce large voids in the patties formed in the mold cavity or which might even tend to prevent a sufficient quantity of meat from being placed within the mold cavity.

It should also be noted that the top of the knock out cup 148 has a plurality of holes 156 which act to allow air into the knock out cup behind the patty, to prevent a vacuum from forming between the patty and the cup. Such a vacuum would tend to cause the patty which had been knocked from the mold cavity to adhere to the knock out cup. The air holes, therefore, assist in the release of the patty from the knock out cup.

The interleaving paper dispensing means, generally indicated at 32 operates in synchronization with the mold ejection means 30, since both systems are actuated by vertical movement of the vertical oscillating shaft 80. The interleaving paper dispensing means is most clearly shown in FIGS. 7 and 8 and, as mentioned previously, consists of a motor 44 which drives a conveyor belt 46 on which is placed a stack of individual interleaving papers 158. The papers are supported underneath the belt by means of a conveyor belt support bracket 160 and are held in position by two rear pins 162 against which the stack is placed, and by a paper holder pin 164 which extends up through a hole 166 placed in each individual interleaving paper.

The motor 44 for the conveyor belt is connected to the main switch 40 of the entire machine and, therefore, it is automatically turned on when the drive motor 58 is turned on, so that the conveyor belt is in constant movement. The stack of papers 158 on the conveyor belt is prevented from movement by a paper holder pin 164, so the papers will remain stationary until the vertical oscillating shaft 80 is pulled downward by spring 94 when the cam surface 86 coacts with the cam roller 88. When the vertical oscillating shaft 80 is moved down, then a paper pressure arm 154 will bear down on paper pressure foot 163 through the paper pressure arm spring 165. The paper pressure foot is held in position by a paper pressure foot shaft 167 around which spring 165 is disposed.

When the pressure is increased on the paper pressure foot, it will force the bundle of papers 158 downward against the moving conveyor belt with enough force so that the friction produced between the lowermost paper and moving conveyor belt will be sufficient to rip the bottom paper on the stack away from the paper holding pin 164 and start the paper moving along the conveyor belt towards the horizontally positioned support rods 168.

To insure that the paper will continue to move along with the conveyor belt, two hold down arms 171 pivotally mounted on a rod 173 which in turn is supported by a bracket 174 connected to the housing will bear downward on the paper to maintain the frictional contact between the paper and the moving conveyor belt.

When the individual sheet of paper reaches the end of the conveyor belt, it will fall downward and continue its movement to the right, as shown in FIG. 7, until it comes to rest on the horizontally placed support rods 168 and will be positioned on these rods by means of removable paper stops 170 on the rods. The paper will wait in this proper position until the knock out cup 148 ejects the patty from the mold cavity which will then be located over the horizontally placed support rods. After the patty is ejected from the mold cavity, it will then fall a short distance to be on top of the sheet of paper held by the horizontal rods.

Shortly after this happens, the support rods 168 will be rapidly rotated to the vertical position, as shown in dashed lines in FIG. 7, at a speed that is faster than the rate at which the patty and the paper can fall, so that the patty with the interleaved paper beneath it will fall to form the stack of interleaved patties 36 shown in FIG. 7. The rods 168 are rotated faster than the patty and paper by connecting the rods 168 to a tube 172 which is rotatably mounted on a shaft 175 extending from the front wall 50 of the machine housing.

A flange 176 is fitted on the tube 172 and is connected by means of a horizontal link 178 and a vertical link 180 to a lever 182 from which a roller 184 contacts a cam 186 which is driven by the vertical rotating shaft 70. See FIGS. 7 and 10. The horizontal link is rotatably connected to a pin 204 extending from flange 176, near the periphery of the flange.

The cam 186 has a very large and sharply rising lobe 188 which, when brought into contact with roller 184 by rotating in the direction of the arrow shown, will cause the roller to rapidly move to the left of FIG. 10, thereby rapidly pivoting the lever arm 182 about its pivot point 190.

As can be seen from the shape of cam lobe 188, the support rods 168 are intended to remain in the vertical position, or other than the horizontal position, for only a very short time. As the cam continues to rotate clockwise, as shown in FIG. 10, the cam lever 182 will be urged to the right, in operative contact with cam 186 of spring 192 connected to a strap 194 which in turn is connected to the flange 176 of the tube for the support rods. As shown in FIG. 7, the strap 194 is connected to the flange 176 by means of an anchoring button 196. The strap will continue to rotate the support arms 168 clockwise until the contact stop 198 on flange 176 contacts the fixed stop 200 which extends from the machine housing. Spring 192 is anchored to the front wall 50 of the machine housing by means of a pin 202.

Having explained the operation of the individual components, the operation of the entire machine is straightforward. The speed reduction transmission 60 drives rotating vertical shaft 70 to rotate the meat feeding unit 110 within the hopper 26 to force the meat into exit housing 130 and down through the passages 132 and 138 in the housing and the spacing plate respectively into the mold cavity 134. The mold cavity which is located in mold plate 28 is moved from its initial loading position in which the meat or other substance is forced into the cavity to its eject position at which point the knock out cup 148 ejects the patty from the mold cavity downward onto the sheet of paper which is resting on the support rods 168. Since when the hopper is initially loaded it will take more than one revolution of the meat feeding unit before any substance in the hopper is passed into the mold cavity and delivered to the eject station, by that time, the vertical oscillating shaft has been depressed several times in synchronization with the revolutions of the meat feeding unit so that a sheet of interleaving paper will have reached and been placed on the support rods 168, awaiting the ejection of the patty onto the interleaving paper. After the patty is ejected, the cam 186 driven by vertical rotating shaft 70 will cause the cam lever 182 to pivot, thereby pulling vertical and horizontal linkages 180 and 178 which are pivotally connected to the flange 176 by means of the rotatable connection pin 204 extending from the flange, so that the support rods 168 will rotate rapidly downward and thereby allowing an interleaved patty to maintain a true horizontal attitude and fall straight downward to form a neat stack 36 at the side of the machine.

It should be pointed out that although the machine has been discussed with reference to producing meat patties, many other materials are capable of being formed into patties by this apparatus, such as fish, candy, or any other edible substance.

It should also be noted that since the sprockets for the shaft from the bottom of the speed reduction transmission and the vertical rotating shaft are the same size, the vertical rotating shaft and the speed reduction transmission will be in synchronization. So will the movements of the vertical oscillating shaft, since they are determined by the rotating cam 82, which rotates at the same speed as the speed reduction transmission 60. Therefore, all that is necessary to provide complete synchronization of all components of the system is merely the proper relative angular alignment between the components, such as the crank arm 106 which drives the mold plate and shaft 78, the cam 186 which drives the rotation of the support fingers with shaft 70, and the cam 82 with shaft 78 which drives the oscillation of vertical oscillating shaft.

Since there is always a sheet of paper underneath each patty before the patty is ejected from the mold cavity, the machine prevents the situation where two patties formed by the apparatus come in contact with each other and, therefore, will almost inevitably be fused together during further processing as, for example, when they are frozen.

As mentioned previously, because of the air passage groove 155 at the bottom of the mold plate, an easy access path is provided for air to leave the mold cavity, thereby insuring that the mold cavity will be easily and uniformly filled with material dispensed from the feeder unit and thereby insuring that there will be no large voids or non-uniformities produced in the patties.

The mold plate 28 can be quickly and easily changed in the machine merely by detaching the mold plate from the back drive unit 140 of the molding system. Therefore, patties of different thicknesses or shapes can easily be provided.

It should be noted that the operation of this machine is independent of the thickness or the shape of the paper or whether the weight of the patties will be heavy enough to deform the support means holding up the paper when the patty is placed onto it in the present apparatus. The paper is firmly held by support rods and the patty is placed on the support rods which are firmly positioned. Only after the patty is firmly on the paper are the support rods drawn away at a speed which is greater than that at which the patty can fall. Therefore, the patty will always have a true horizontal attitude and fall directly downward to form neat stacks of interleaved patties.

It will be understood that various changes in the details, materials and arrangements of parts which have been herein described and illustrated in order to explain the nature of the invention may be made by those skilled in the art within the principle and scope of the invention, as expressed in the appended claims.

I claim:

1. Means for interleaving and stacking formed food patties, comprising:
   a support means;
   means to periodically dispense individual interleaving sheets onto said support means, comprising:
      a continuously moving conveyor belt;
      means to hold a stack of individual interleaving sheets in contact with said continuously moving conveyor belt; and
      means to press a stack of sheets against said conveyor belt to cause a single interleaving sheet in contact with said conveyor belt to separate from said stack of interleaving sheets and be drawn along said conveyor belt to said support means;
   means to periodically dispense formed food patties onto said interleaving sheets on said support means;
   means to sequentially synchronize the dispensing of said interleaving sheets and said formed patties onto said support means; and
   means to remove said support means from beneath said interleaving sheets and formed patties on said support means faster than the rate of free fall of said interleaving sheets and formed patties, so that said interleaving sheets and formed patties will be free to fall without contacting said support means.

2. The means for interleaving and stacking formed food patties according to claim 1, further comprising means to sequentially synchronize the removal of said support means from beneath said interleaving sheets and formed patties with the dispensing of said interleaving sheets and food patties.

3. The means for interleaving and stacking formed food patties according to claim 1, further comprising means to position individual interleaving sheets on said support means.

4. The means for interleaving and stacking formed food patties according to claim 1, further comprising means to position said support means in a horizontal attitude during dispensing of said interleaving sheets and formed patties on to the support means.

5. The means for interleaving and stacking formed food patties according to claim 1, wherein said means to remove said support means from beneath said interleaving sheets and formed food patties comprise:
   pivot means connected to one end of said support means;
   means to pivotally urge said support means to a rest position; and
   actuating means connected to said pivot means to pivot said support means downward out of the path of fall of said interleaving sheet and formed patties.

6. The means for interleaving and stacking formed food patties according to claim 3 wherein:
   said support means comprise a plurality of fingers fixedly connected to a common member; and
   said means to position said individual interleaving sheets on said support means comprise a movable paper stop means positioned on each finger and aligned to position the interleaving sheet with relation to said fingers.

7. The means for interleaving and stacking formed food patties according to claim 1, wherein said means to periodically dispense individual interleaving sheets further comprise:
   pin means to hold a stack of individual interleaving sheets on said conveyor belt; and
   hold down arm means to bear against sheets of paper moving along said conveyor belt to maintain friction between said belt and said sheets.

8. Means for interleaving and stacking food patties, comprising:
   a support means;
   means to periodically dispense individual interleaving sheets onto said support means, comprising:
      a conveyor belt;
      a stack of individual interleaving sheets disposed on said conveyor belt;
      means to hold said stack of individual interleaving sheets on said conveyor belt; and
      means to press said stack of sheets against said conveyor belt to cause the single interleaving sheet in contact with said conveyor belt to separate from said stack of interleaving sheets and be drawn along said conveyor, comprising:
   a vertically oscillating means;
   a pressure foot means to contact the top of said paper stack; and
   spring means coacting with said pressure foot means and said vertically oscillating means to apply pressure on said pressure foot means in response to movement of said vertically oscillating means;

means to periodically dispense formed food patties onto said interleaving sheets on said support means;

means to sequentially synchronize the dispensing of said interleaving sheets and said formed patties onto said support means; and means to remove said support means from beneath said interleaving sheets and formed patties on said support means faster than the rate of free fall of said interleaving sheets and formed patties, so that said interleaving sheets and formed patties will be free to fall without contacting said support means.

9. The means for interleaving and stacking formed food patties according to claim 1 wherein said means to periodically dispense formed food patties onto said interleaving sheet on said support means comprise:

oscillating mold cavity means having a path of travel over said support means; and mold cavity ejection means comprising:
a mold cavity ejection member; and
vertical oscillating means connected to said mold cavity ejection member to cause said mold cavity ejection member to move into the plane of said mold cavity means to eject the patty from said mold cavity means.

10. The means for interleaving and stacking formed food patties according to claim 9, further comprising:

means to synchronize the vertical oscillating movement of said mold cavity ejection means with the oscillations of said mold cavity means; and air release means in said mold cavity means to allow air to pass from said mold cavity means when said mold cavity is being filled.

11. The means for interleaving and stacking formed patties according to claim 2, wherein said means to remove said support means from beneath said interleaving sheet and formed food patty comprise:

pivot means connected to one end of said support means;

means to pivotally urge said support means to a substantially horizontal position; and actuating means connected to said pivot means to pivot said support means downward, out of the path of fall of said interleaving sheet and formed food patty.

12. The means for interleaving and stacking formed patties according to claim 11, wherein said support means comprise:

a plurality of fingers fixedly connected to a common member; and further comprising:

means to position said support means in a substantially horizontal position.

13. The means for interleaving and stacking formed patties according to claim 12, wherein said pivot means comprise:

a shaft;
said common member of said support means rotatably mounted on said shaft; and
said actuating means connected to said support means to pivot said support means comprise:
link means connected to said common member; and
cam means operable to move said link means to cause said cam member to rotate, thereby pivoting said support means.

14. The means for interleaving and stacking formed patties according to claim 13, wherein said means to pivotally urge said support means to a rest position comprise:

spring means urging rotation of said common member against said rotation of said cam and link means; and further comprising:

stop means on said common member adapted to coact with stationary stop means under the urging of said spring means to position said support member in a substantially horizontal position.

15. The means for interleaving and stacking formed patties according to claim 14, wherein said means to periodically dispense individual interleaving sheets further comprise:

pin means to hold a stack of individual interleaving sheets on said conveyor belt; and hold down arm means to bear against sheets of paper moving along said conveyor to maintain friction between said belt and said sheets.

16. Means for interleaving and stacking formed food patties, comprising:

a support means including a plurality of fingers fixedly connected to a common member;

means to position said support means in a substantially horizontal position;

means to periodically dispense individual interleaving sheets onto said support means, including:

a conveyor belt;

a stack of individual interleaving sheets disposed on said conveyor belt;

means to hold said stack of individual interleaving sheets on said conveyor belt; and means to press said stack of sheets against said conveyor belt to cause the single interleaving sheet in contact with said conveyor belt to separate from said stack of interleaving sheets and be drawn along said conveyor comprising:

a vertically oscillating means;

a pressure foot means to contact the top of said paper stack; and spring means coacting with said pressure foot means and said vertically oscillating means to apply pressure on said pressure foot means in response to movement of said vertically oscillating means;

means to periodically dispense formed food patties onto said interleaving sheets on said support means;

means to sequentially synchronize the dispensing of said interleaving sheets and said formed patties onto said support means;

means to remove said support means from beneath said interleaving sheets and formed patties on said support means faster than the rate of free fall of said interleaving sheets and formed patties, so that said interleaving sheets and formed patties will be free to fall without contacting said support means, comprising:

pivot means connected to one end of said support means;

means to pivotally urge said support means to a substantially horizontal position; and actuating means connected to said pivot means to pivot said support means downward, out of the path of fall of said interleaving sheet and formed food patty;

said pivot means comprising:
a shaft;
said common member of said support means rotatably mounted on said shaft; and
said actuating means connected to said support means to pivot said support means comprise:
link means connected to said common member; and
cam means operable to move said link means to cause said cam member to rotate, thereby pivoting said support means;
said means to pivotally urge said support means to a rest position comprise:
spring means urging rotation of said common member against said rotation of said cam and link means; and further comprising:
stop means on said common member adapted to coact with stationary stop means under the urging of said spring means to position said support member in a substantially horizontal position; and
means to sequentially synchronize the removal of said support means from beneath said interleaving sheets and formed patties with the dispensing of said interleaving sheets and food patties.

17. The means for interleaving and stacking formed food patties according to claim 16, wherein said means to periodically dispense formed food patties onto said interleaving sheet on said support means comprise:
oscillating mold cavity means having a path of travel over said support means; and
mold cavity ejection means comprising:
a mold cavity ejection member; and
vertical oscillating means connected to said mold cavity ejection member to cause said mold cavity ejection member to move into the plane of said mold cavity means to eject the patty from said mold cavity means.

18. The means for interleaving and stacking formed food patties according to claim 17, wherein said means to sequentially synchronize the dispensing of said interleaving sheets and said formed patties of food comprise:
a vertically oscillated shaft;
said mold cavity ejecting member connected to and oscillating with said vertically oscillating shaft; and said spring means coacting with said pressure foot means coacting with said vertically oscillating shaft.

19. The means for interleaving and stacking formed food patties according to claim 18, wherein the means to synchronize the removal of said support means with the dispensing of said interleaving sheets and formed patties, comprise:
a rotating shaft;
first cam means on said rotating shaft actuating the pivoting of said support means;
second cam means operatively connected to said rotating shaft and rotating at the same speed as said first cam means; and
said vertical oscillating shaft oscillating by action of said second cam means.

20. The means for interleaving and stacking formed food patties according to claim 19, further comprising a meat feeding unit operatively connected to said mold cavity means to feed food to said mold cavity means.

* * * * *